US006365989B1

(12) United States Patent
O'Donnell

(10) Patent No.: US 6,365,989 B1
(45) Date of Patent: Apr. 2, 2002

(54) SYSTEM AND METHOD FOR CONTROLLING ONE OR MORE MAINS VOLTAGE ELECTRICAL DEVICES FROM AN EXTRA-LOW VOLTAGE SOURCE

(75) Inventor: Patrick O'Donnell, 1905 Shakepeare Street, Victoria, British Columbia (CA), V8R 4E7

(73) Assignees: Patrick O'Donnell; Christopher J. Carter, both of Victoria (CA)

( * ) Notice: Subject to any disclaimer, the term of this patent is extended or adjusted under 35 U.S.C. 154(b) by 0 days.

(21) Appl. No.: 09/532,194

(22) Filed: Mar. 22, 2000

(30) Foreign Application Priority Data

Mar. 26, 1999 (CA) .............................. 2267883

(51) Int. Cl.[7] ................................................ H01H 3/00
(52) U.S. Cl. ....................................................... 307/42
(58) Field of Search ............................... 307/11, 30, 36, 307/37, 42; 363/144, 146

(56) References Cited

U.S. PATENT DOCUMENTS

| 3,612,953 A | * 10/1971 | Gittin | ............................ | 307/42 |
| 3,851,226 A | * 11/1974 | Chen | ............................ | 317/120 |
| 4,340,772 A | * 7/1982 | Bose | ............................ | 174/51 |

* cited by examiner

Primary Examiner—Matthew Nguyen
(74) Attorney, Agent, or Firm—Black Lowe & Graham PLLC

(57) ABSTRACT

An electrical control wiring system in which mains voltage (115 volts to 600 volts) power loads in a home or in a commercial building are controlled by use of extra low voltage devices such as switches, variable resistances and microcontrollers. Wires are routed from an electrical panel and looped between special electrical device enclosures that in some respects resemble conventional electrical outlet boxes. The special electrical device enclosures are located in walls so that the front edges appear flush with the finished wall as would be the case with a conventional electrical outlet box in a finished room. The mains voltage wiring is done in the manner normally used in mains voltage wiring. Multi-conductor extra-low voltage cable such as Category 5 cable is routed from a control location and looped to the same special electrical device enclosure locations. The special electrical device enclosure has a plate, which is removable from within the special electrical device enclosure and once this plate is removed, a large opening is present in one wall of the special electrical device enclosure. The extra-low voltage wiring is accessible through the large opening in one wall of the special electrical device enclosure. The extra-low voltage cables may be pulled out through the open front of the special electrical device enclosure and connected to the controlling connections of a controlling device. The controlling device contains components that provide control of the load and a means of electrically separating the mains voltage system from the extra-low voltage system. The controlling device has a plate of size and shape similar to the plate removed from the special electrical device enclosure. An orifice is present in the plate that is part of the controlling device and controlled connections pass through this orifice to connect to components such as a power relay or a triac. When the controlling device is inserted in to the special electrical device enclosure through the front opening of the special electrical device enclosure, physical separation of the mains voltage wire and the extra-low voltage wires is achieved. The controlled connections are present in the special electrical device enclosure for connection to the mains voltage wires and to the mains voltage load. The extra-low voltage cables are accessible by removal of the controlling device or by removal of the plate.

7 Claims, 8 Drawing Sheets

SYSTEM AND METHOD FOR CONTROLLING ONE OR MORE MAINS VOLTAGE ELECTRICAL DEVICES FROM AN EXTRA-LOW VOLTAGE SOURCE

FIELD OF THE INVENTION

This invention relates to the field of electronic controlling devices and methods. More particularly, the present invention relates to a controlling system for use in a room or area of a building such as a house or office, to provide various control methods for devices such as light fixtures, receptacles and electrical devices attached thereto, and heating devices, all of which operate from AC mains electrical supply voltages, by means of conveniently grouped or individual controlling devices which operate from an extra low voltage supply.

BACKGROUND OF THE INVENTION

For several years there have been known methods of controlling the brightness of incandescent light bulbs to create an ambiance in rooms. More recently there have been methods to control the brightness of fluorescent lamps. Still more recently there has been a desire to control the power output from a wall receptacle in order to vary the brightness of a lamp which is electrically attached to the receptacle.

Early methods of light dimming used large variable resistors that carried the same current as the dimmed light bulb. This method produced a great deal of heat and wasted a great deal of power. More recent methods make use of semi-conductor devices known as triacs. Several variations are known and they are based on the fact that power output from a triac can be controlled by varying the point in the AC waveform at which the triac is turned on. In so doing the portion of the AC waveform reaching the load is controlled. In order to control the point at which the triac is turned on, a variable resistance is provided and this is usually connected to a rotating knob or a sliding lever. In either case, the variable resistor, which is adjusted by a human being moving the knob or sliding lever is part of the same electrical circuit as the triac and is housed in a container together with the triac.

The previously mentioned triac and variable resistor, together with other electronic components such as capacitors are assembled into a device which has become commonly known as a dimmer switch. A typical dimmer switch is designed for installation in an electrical outlet box. Traditionally, when separate dimming control has been required for more than one light or group of lights, additional dimmer switches and additional electrical outlet boxes to contain said additional dimmer switches are required. Each dimmer switch requires a separate electrical outlet box. A problem arises when these traditional dimmer switches are grouped or ganged. Because the components produce heat while controlling a load, the rated load carrying capability for each dimmer switch must be reduced. In large rooms such as banquet rooms in a hotel for example, where several lights are controlled by a single dimmer switch, and several groups of lights are controlled from a common location, it is often necessary to use large dimmer switches with metal heat sinks attached. Alternatively, several individual boxes must be spaced apart on the wall. Neither situation is aesthetically pleasing.

Recently there has been a desire to control all lights and receptacles in certain rooms of homes so that a great degree of flexibility is available to the occupant for creating lighting scenarios. The occupant may want a bright room for entertaining and a dim room for relaxation. The occupant may wish to have all lights on, only one light on or no lights on. There are numerous possibilities if the occupant has control over all lights and receptacles. Because the receptacles are normally rated for 15 Amps and there is the possibility that a device requiring 12 amps may be connected to the receptacle, a dimmer switch controlling an individual receptacle must be capable of handling such a load. The dimmer switches normally found in homes are usually approved for use with a permanently connected incandescent load of 600 Watts. This load must be reduced if the dimmer switches are grouped or ganged. For example the Leviton 6602 dimmer switch has CSA approval as a 600 Watt device. This is reduced to 500 Watts if two are ganged and reduced to 400 Watts if more than two are ganged. If the occupant of a home had a desire to control, for example, six receptacles and two lighting outlets in a room, this would require using eight boxes and eight large dimming devices. This would be very expensive and would not be very pleasing to the eye since there is not enough space between wall studs in standard construction to allow for a continuous row of boxes.

Very recently, a number of companies have tried to provide methods of controlling individual devices in a room by providing control modules that plug into existing electrical receptacles and receive a control signal from a remote source. One such system, known as X10 uses the power line carrier method to convey a signal for control purposes. Another system, provides control by sending radio frequency signals to the controlled device. Both of the methods mentioned are referred to as wireless control and these systems were used because of restrictions in the electrical code which require that:

a) Wiring of extra low voltage systems must be physically separated from the wiring of mains voltage systems and if present in the same box must be separated by a suitable barrier.

b) The connection terminals for both systems must be accessible for the purposes of maintenance and inspection after installation.

Since electronic components normally operate at extra low voltages, there was no way to satisfy the code requirements where a wired system was desired, other than to use a central controlling panel. When a central control panel is used there must be a separate mains voltage cable run from the panel to each controlled device or to each controlled group of devices. This is very expensive to do and very wasteful of material. In comparison to the central panel method, the wireless methods allow for wire to be looped from one receptacle to the next in the normal manner and these systems are less wasteful of material. However, both the power line carrier method and the radio frequency method of wireless control experience problems from interference and this affects their reliability.

The power line carrier technology is vulnerable to power spikes on the electrical power system, over which it has not control. Power line carrier devices are expensive and must use other expensive components to attempt to deal with interference problems. Even with surge protection devices present in a circuit the reliability is questionable.

The radio frequency technology experiences a number of problems. For example, if a control signal is strong enough to travel from one end of a home to the opposite end of the home, it is also likely to be strong enough to enter a neighboring home. For this reason the radio frequency wireless method is claimed to be best suited where ample space exists between neighboring homes. When a lower signal strength is used, it may not be strong enough to pass through the walls in a home and signal boosting devices may be needed.

Additional problems occur for both systems, which can switch on power devices when they should be off. For example a baby monitor or a garage door opener from a neighboring home can cause false switching in the radio frequency system. A power line carrier signal can travel back through the electrical panel and onto the utility company power lines into a neighboring home, possibly causing fals switching.

Disclosed in the prior technical literature are several inventions which make use of wireless methods of control. Other inventions disclose control systems and wiring systems using a central control panel, for example Spira and Zaharchuck, Canada Patent No. 1243728 discloses a lighting scene control panel and control circuit. This system uses a central dimming panel and does not distribute control to individual controlled devices. With this system, individual mains voltage wires would be required to be routed from the central dimming panel to each light or group of lights to be dimmed. This system provides only dimming control of lights and makes no provision for controlling other power loads such as heaters and receptacles by ON/OFF control.

There is a need, not met by present systems and methods, for a controlling system and wiring methods that can provide distributed ON/OFF or variable control of electrical power loads, in a manner that is practical to implement, reliable, safe, affordable and which meets with the requirements of the electrical code.

SUMMARY OF THE INVENTION

The present invention is directed in one aspect to providing an electrical wiring system, in which wires from a mains voltage (normally 115 volts to 600 volts) source of supply, and wires from an extra-low voltage (normally 30 volts or less) source of supply, are routed within walls, and in particular within walls of stud and wallboard construction, within ceiling spaces or through joist spaces of a building, such as a home or an office, for the purpose of controlling the electrical current supplied to electrical devices such as receptacles, lights and heaters, so that said mains voltage wires enter an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure, and so that said extra-low voltage wires are available for connection to a controlling device, said controlling device having controlling connections, controlled connections and said controlling device being installable through the open front of said electrical device enclosure, then through said large opening in one wall of said electrical device enclosure so that with said controlling device attached to said electrical device enclosure a physical barrier is present between said mains voltage wires and said extra-low voltage wires, said extra-low voltage wires being accessible when said removable plate is removed or when said controlling device is removed from within said electrical device enclosure.

In another aspect the present invention is directed to providing a control system in which individual or grouped extra low voltage (normally 30 volts or less) control elements, such as switches and variable resistances, control one or more mains voltage (normally 115 volts to 600 volts) electrical devices, such as receptacles, lights or heaters, by means of wires, operating at extra-low voltage levels, connected to controlling devices, said controlling devices having controlled connections and controlling connections, said controlling devices comprising a means of providing electrical separation of said controlling connections from said controlled connections, such as a relay or an optical-coupling means, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

In yet another aspect, the present invention is directed to providing a control system in which individual or grouped extra low voltage (normally 30 volts or less) control elements, such as switches and variable resistances, control one or more mains voltage (normally 115 volts to 600 volts) electrical devices, such as receptacles, lights or heaters, by means of wires, operating at extra-low voltage levels, connected to controlling devices for the purpose of supplying power and for transferring digital data, said controlling devices having controlled connections and controlling connections, said controlling devices comprising a means of providing electrical separation of said controlling connections from said controlled connections, such as a relay or an optical-coupling means, said controlling devices further comprising a memory device for storing digital data, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

In yet another aspect, the present invention is directed to providing a control system in which individual or grouped extra low voltage (normally 30 volts or less) control elements, such as switches and variable resistances, control one or more mains voltage (normally 115 volts to 600 volts) electrical devices, such as receptacles, lights or heaters, by means of wires, operating at extra-low voltage levels, connected to controlling devices for the purpose of supplying power and for transferring digital data, said controlling devices having controlled connections and controlling connections, said controlling devices comprising a means of providing electrical separation of said controlling connections from said controlled connections, such as a relay or an optical-coupling means, said controlling devices further comprising a microcontroller for storing and manipulating digital data, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

In yet another aspect, the present invention is directed to providing a control system in which individual or grouped extra low voltage (normally 30 volts or less) control elements, such as switches and variable resistances, are used as inputs to a microcontroller, said microcontroller containing a program to interpret said inputs and provide outputs for control of one or more mains voltage (normally 115 volts to 600 volts) electrical devices, such as receptacles, lights or heaters, by means of wires, operating at extra-low voltage levels, connected to controlling devices for the purpose of supplying power and for transferring digital data, said controlling devices having controlled connections, and controlling connections, said controlling devices comprising a means of providing electrical separation of said controlling connections from said controlled connections, such as a relay or an optical-coupling means, said controlling devices further comprising a memory device for storing digital data, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

In yet another aspect, the present invention is directed to providing a control system in which individual or grouped extra low voltage (normally 30 volts or less) control elements, such as switches and variable resistances, are used as inputs to a first mircrocontroller, said first microcontroller containing a program to interpret said inputs and transfer data to one or more additional microcontrollers so that said additional microcontrollers, through a program stored therein, can control one or more mains voltage (normally 115 volts to 600 volts) electrical devices, such as receptacles, lights or heaters, by means of wires, operating at extra-low voltage levels, connected to controlling devices for the purpose of supplying power and for transferring digital data, said controlling devices having controlled connections and controlling connections, said controlling devices comprising a means of providing electrical separation of said controlling connections from said controlled connections, such as a relay or an optical-coupling means, said controlling devices further comprising a microcontroller for storing and manipulating digital data, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

In yet another aspect, the present invention is directed to providing a control system in which individual or grouped extra low voltage (normally 30 volts or less) control elements, such as switches and variable resistances, are used as inputs to a first microcontroller, said first microcontroller being of a type suitable for use with the Universal Serial Bus, said first mircrcontroller manipulating said input data and transferring an interpretation of said input data to a program located within the Universal Serial Bus host computer, said host computer program also producing output data which is transferred to one or more additional microcontrollers, said additional microcontrollers being of a type suitable for use with the Universal Serial Bus, so that said additional microcontrollers, through a program stored therein, can control one or more mains voltage (normally 115 volts to 600 volts) electrical devices, such as receptacles, lights or heaters, by means of wires, operating at extra-low levels and of a type suitable for use in the transfer of data at speeds required by the Universal Serial Bus, connected to controlling devices for the purpose of supplying power and for transferring digital data, said controlling devices having controlled connections and controlling connections, said controlling devices comprising a means of providing electrical separation of said controlling connections from said controlled connections, such as a relay or an optical-coupling means, said controlling devices further comprising a microcontroller of a type suitable for use with the Universal Serial Bus, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

DETAILED DESCRIPTION OF THE PREFERRED EMBODIMENT

Figure 1:
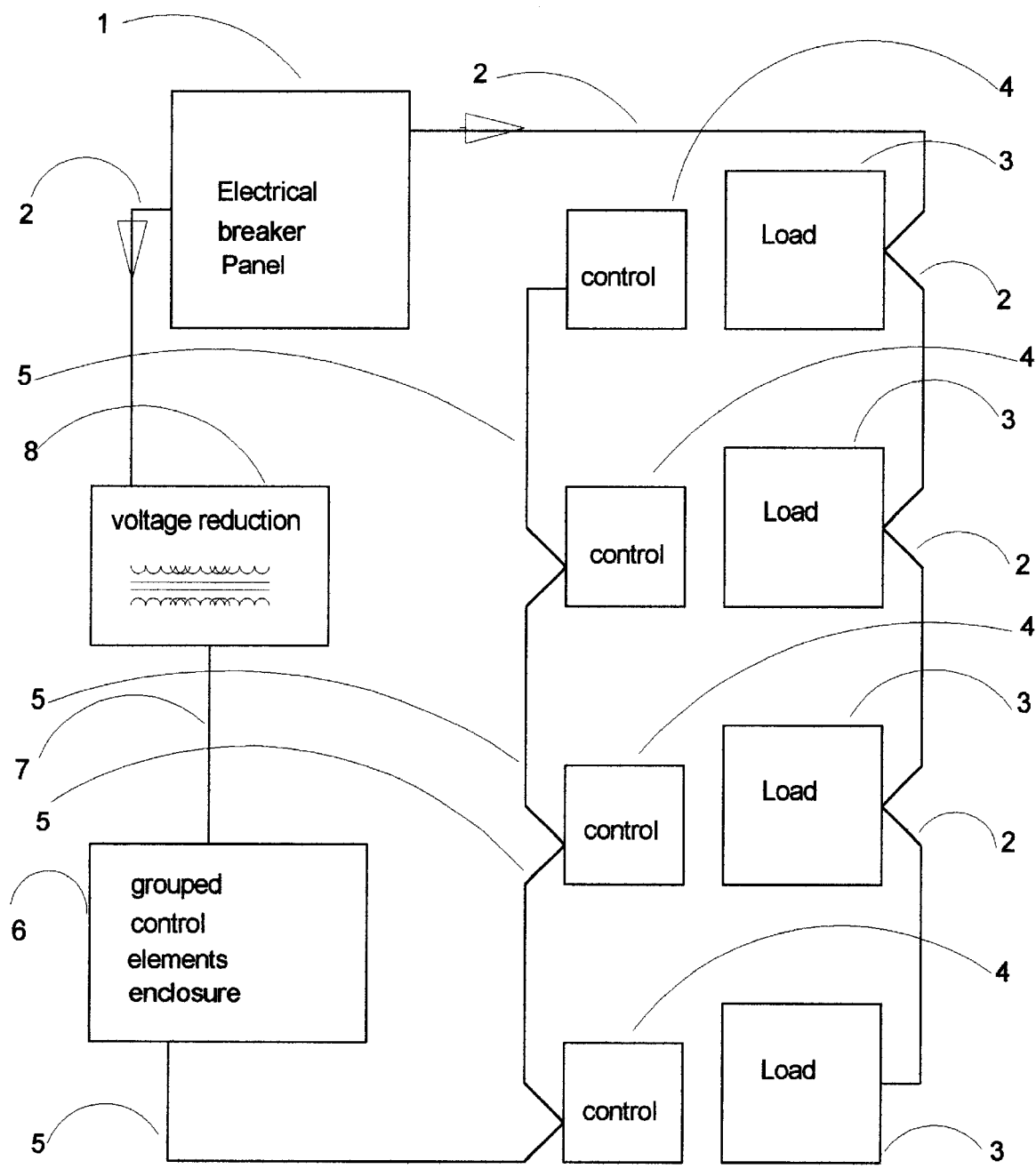
FIG. 1 is a schematic diagram of an electrical circuit in block form in accordance with the present invention, showing that the grouped controlling elements are remote from the distributed controlled devices.

FIG. 1 shows a block diagram of a system and methods for controlling one or more mains voltage electrical devices from an extra low voltage source. Lines between blocks in FIG. 1 represent multi-conductor cable which would normally include circuit conductors and a grounding conductor. A supply of electrical current is available from the electrical panel 1 and mains voltage wires 2 are connected to circuit protection devices, neutral and ground in the manner required by the electrical code. Said mains voltage wires are distributed to special electrical device enclosures. The special electrical device enclosures are disclosed in a separate invention by the same inventor entitled ENCLOSURE FOR INTERFACING ELECTRICAL AND CONTROL OR COMMUNICATION DEVICES and are indicated here as the load 3.

The special electrical device enclosures (not shown) are located in the walls of a building and attached to wall studs in a known manner. The special electrical device enclosures are used to accommodate the connection of devices such receptacles, lights, heaters and other power devices in a manner similar to that of conventional electrical outlet boxes. However, in the special electrical device enclosures one wall has a large opening therein which is covered by a plate which is removable through the open front of the special electrical device enclosure.

The special electrical device enclosure removable plate (not shown) is removed and replaced by a controlling device (shown in FIG. 8), which has a similarly shaped plate as a part if it's enclosure. Said controlling device, represented in FIG. 1 as a control 4, once inserted into the special electrical device enclosure through the front opening and then through said large opening in one wall, provides a barrier between the mains voltage wires 2 and the extra low voltage wires 5. The controlling device contains components, such as optical couplers, relays or pneumatic components to provide control of a mains voltage electrical load while maintaining electrical separation from the controlling system. The wiring of the mains voltage system is available for connection to devices in the special electrical device enclosure, and the extra low voltage wiring of the controlling system is accessible by simple removing the controlling device through the open front of the special electrical device enclosure.

Where more than one load 3 is to be controlled, the mains voltage wires 2 may be looped from one special electrical device enclosure to the next special electrical device enclosure in the manner normally used in the wiring of buildings such as homes. Multi-conductor extra low voltage cable 5 may be looped from controlling device 4 to controlling device 4, then looped to a single or grouped control element enclosure or plate 6, which would normally be mounted on a wall within a room at a location where a human being would expect to find a means of controlling a light in a room. The grouped control element enclosure is provided with an extra low voltage power source through wires 7 and an approved means of voltage reduction 8 such as a transformer. A means of rectification may also be used where a direct current is needed by the controlling device 4.

Figure 8:
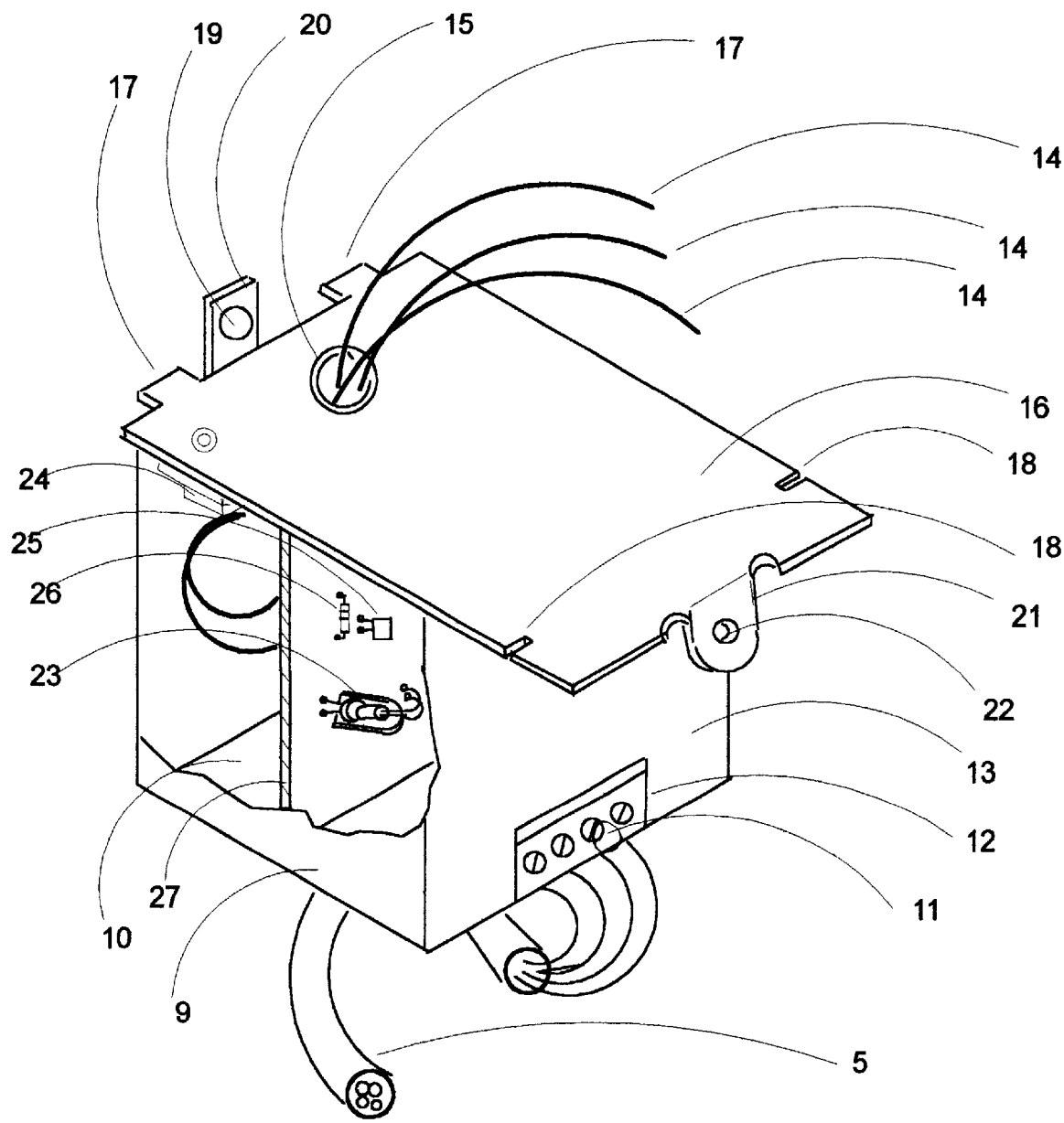
FIG. 8 is a schematic isometric view of a controlling device in accordance with the present invention, shown in an enclosure for a controlling device with a portion of the side exterior wall of the enclosure cut away. The enclosure shown is further disclosed in a separate invention by the same inventor entitled ENCLOSURE FOR INTERFACING ELECTRICAL AND CONTROL OR COMMUNICATION DEVICES.

Referring to FIG. 8, the controlling device 4, shown in block form in FIG. 1, is shown here as a schematic isometric view with a portion of a side wall 9 cut away to expose the interior 10 of the controlling device 4. Extra low voltage wires 5 terminate in controlling connections 11 which protrude through an orifice 12 created by removing a portion of the front wall 13 and the bottom wall (not shown). Mains voltage controlled connections 14 pass through an orifice 15 and into the interior 10 of the controlling device 4. The mains voltage controlled connections 14 are available for connection to the mains voltage wires 2, within said special electrical device enclosure (not shown) and the controlling device 4 forms a barrier between the extra low wires 5 and the mains voltage wires 2.

The top plate 16 of the controlling device 4 has a shape and size similar to the removable plate (not shown) of the special electrical device enclosure (not shown), so that the removable plate may be removed and the controlling device 4 may be passed through a large opening in one wall of the special electrical device enclosure, then attached to the special electrical device enclosure using attachment elements 17 and mating interference elements 18. The controlling device enclosure is electrically connected to the special electrical device enclosure to ensure grounding continuity by use of a screw (not shown) passing through an orifice 19 on a bent tab 20, into an orifice on the back wall of the special electrical device enclosure (not shown).

With the controlling device 4 attached to the special electrical device enclosure (not shown) the interior of the special electrical device enclosure resembles a normal electrical outlet box. The attached controlling device 4 is located behind the wallboard out of sight, but is accessible when access is required. The top plate 16 of the controlling device 4 is visible from within the special electrical device enclosure and it appears to be the bottom wall of the special electrical device enclosure.

When viewed with a receptacle or other electrical device removed, the special electrical device enclosure appears to be a normal electrical outlet box. However, if neither the removable plate (not shown) nor the controlling device 4 are installed into the special electrical device enclosure 5 it cannot be used as an electrical outlet box and a receptacle or other device cannot be correctly attached to the special electrical device enclosure. This design is preferred for safety, so that the special electrical device enclosure cannot have the removable plate absent, leaving a large opening through which fire may spread. It is obvious to the inventor that various other plate designs can be used, for example without the front tab 21 and the orifice 22.

Figure 6:
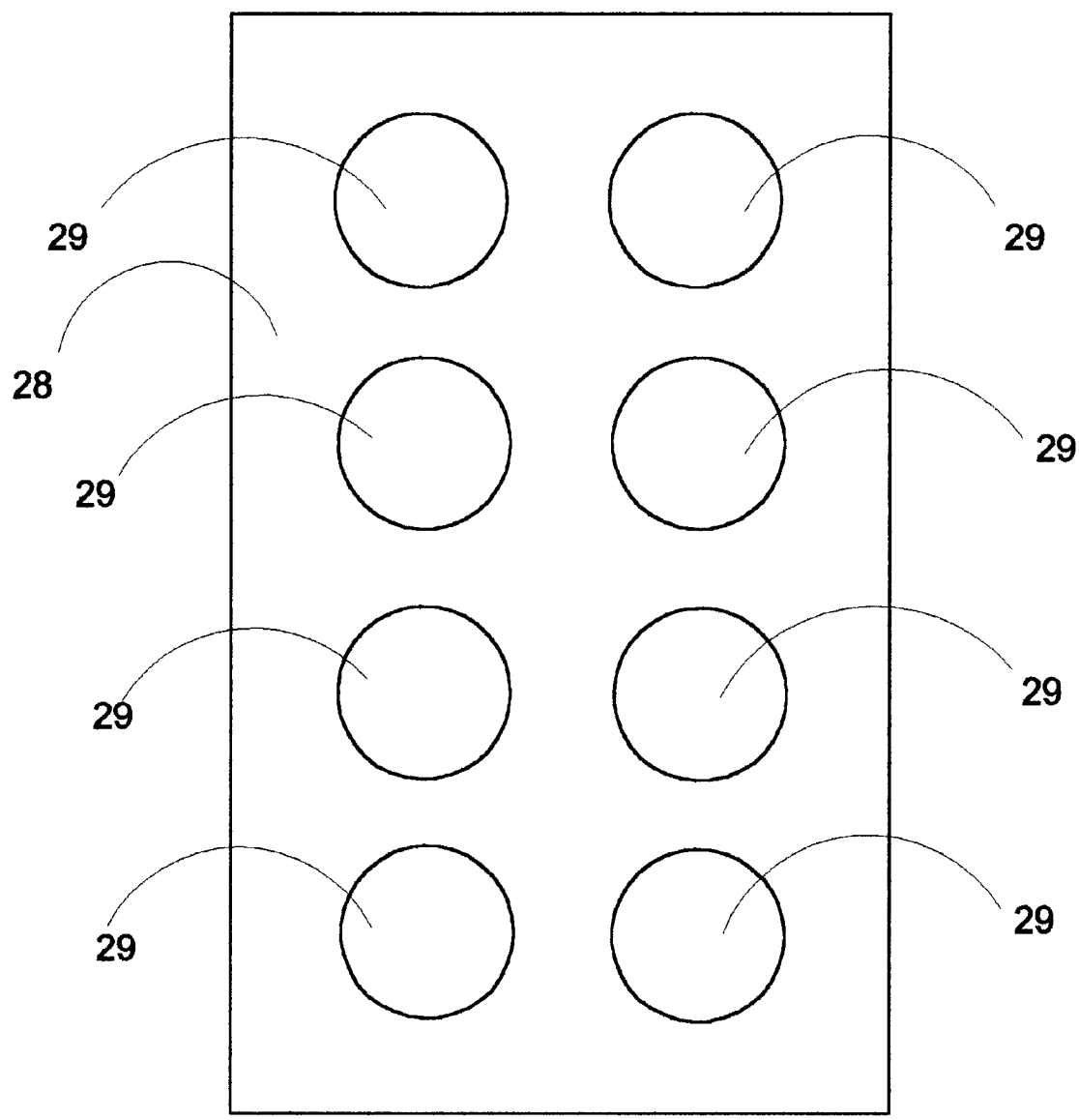
FIG. 6 is a plan view of a first preferred embodiment of a faceplate for grouped control elements in accordance with the present invention.
Figure 7:
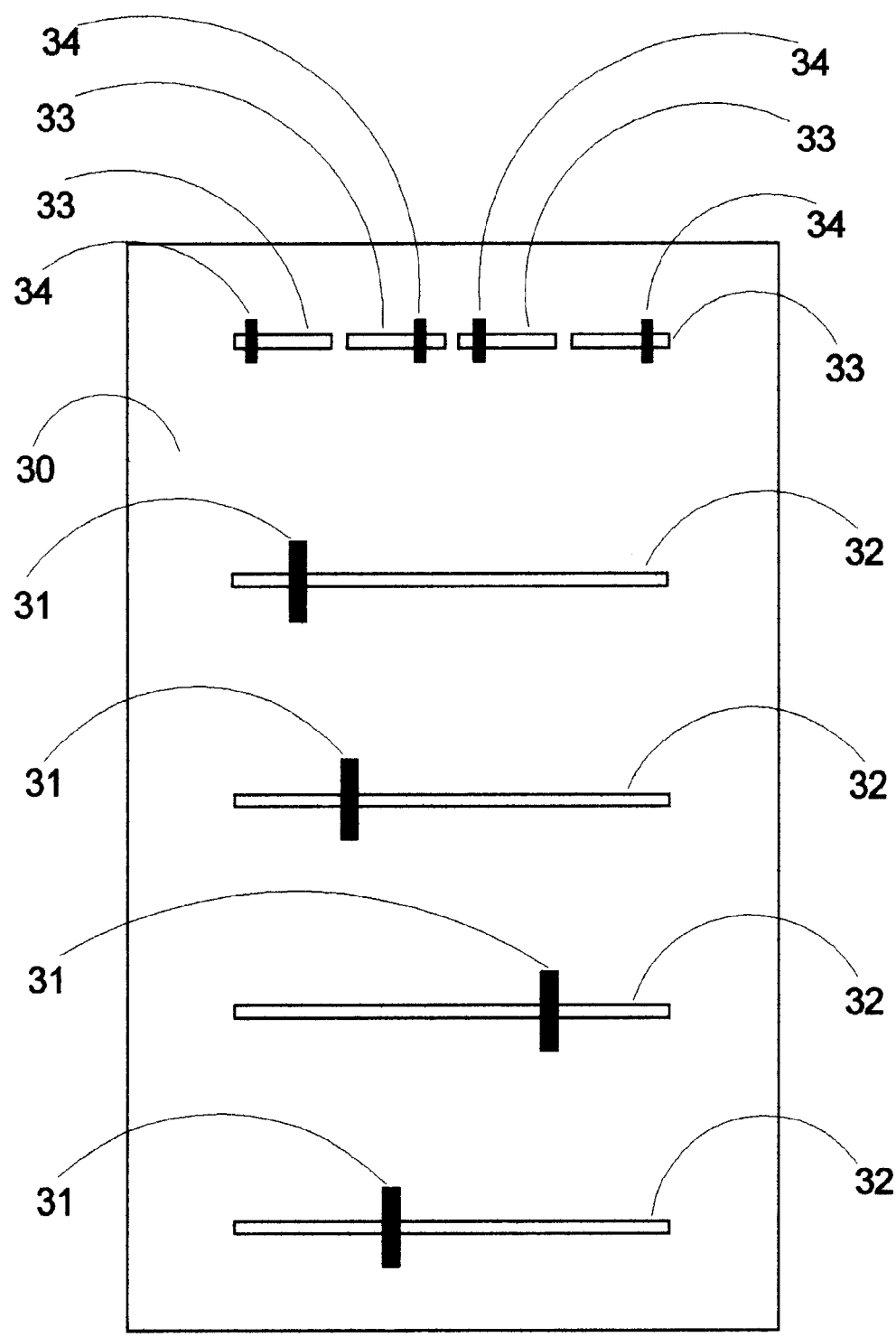
FIG. 7 is a plan view of second preferred embodiment of a faceplate for grouped control elements in accordance with the present invention.

The mains voltage controlled connections 14 connect to the power terminals of a device such as a triac 24 or a relay (not shown) within the interior 10 of the controlling device 4, while the controlling connections of the controlling device connect to the coil of a relay (not shown) or to an optical coupling means 23, shown generally here. Several variations are possible for controlling components which will permit a physical separation to be maintained between mains voltage wiring and extra low voltage wiring. In the most simple control situation only a relay is required in the interior 10 of controlling device 4. Where dimming control is required, several components such as a triac 24, a capacitor 25, a resistor 26 and a diac (not shown) may be required and a printed circuit board 27 may be required to connect these components together. FIG. 2, FIG. 3, FIG. 4, and FIG. 5 show some possible control circuits and there are many other variations which will provide similar control results.

Where dimming control is required, the variable resistor normally associated with dimmer switches and normally adjusted by means of a rotating knob or a slider is not included as a component of the controlling device, but is provided separately at a remote location any may be grouped with other such variable resistors so that variable control of a plurality of loads may be provided from a compact grouped location. Where ON/OFF control is required, this can be provided in a similar grouped manner so that ON/OFF control of a plurality of loads may be provided from a compact grouped location.

Where both variable control and ON/OFF control are required for loads in a room or an area, switches and variable resistors may form part of the same grouped control elements enclosure. FIG. 6 and FIG. 7 show possible arrangements for a grouped control location. In both cases, a plurality of loads may be controlled from a faceplate which would fit over one single electrical outlet box and would have only extra low voltage wires present and connected thereto.

Referring to FIG. 6, a first preferred faceplate, referred to in FIG. 1 in block form as a grouped control element enclosure 6, is indicated generally here by the numeral 28. A plurality of knobs 29 for selectively being turned in a clockwise or a counter-clockwise direction by a human being for the purpose of controlling the current flow through the extra low voltage wiring 5 are shown. Shafts (not shown) pass through orifices (not shown) on the first preferred faceplate 28, and provide a mechanical connection between knobs and a current controlling means. Said current controlling means may take the form of electrical contacts (not shown) for ON/OFF switching control and for 3-way switching control, or said current controlling means may take the form of a wiper contact and a variable resistance (not shown) for variable control such as light dimming.

Since only extra low voltage is present and since the control currents may be very low, for example 10 mA for each controlled power load, there is no concern about heat being produced and there is no need to reduce the rating of the dimming controls. It is therefore possible to provide aesthetically pleasing dimming control for a plurality of loads from a compact location without the need for several electrical outlet boxes and without the need to reduce the rated load of each dimming device.

Referring to FIG. 7, a second preferred faceplate referred to in FIG. 1 in block form as a grouped control element enclosure 6, is indicated generally here by the numeral 30. A plurality of slide controls 31 for selectively being moved leftward or rightward by a human being for the purpose of controlling the current flow through the extra low voltage wires 5 are shown. Levers (not shown) pass through slots 32 on the second preferred faceplate 30 and provide a mechanical connection between the slide controls 31 and a current controlling means. Said current controlling means may take the form of electrical contacts (not shown) for On/OFF switching control and for 3-way switching control, and where this is the case, shorter slots 33 and a different form of slide control 34 may be present. Said current controlling means may take the form of a wiper contact and a variable resistance (not shown) for variable control such as light dimming.

Since only extra low voltage is present and since the control currents may be very low, for example 10 mA for each controlled power load, there is no concern about heat being produced and there is no need to reduce the rating of the dimming controls. It is therefore possible to provide aesthetically pleasing dimming control for a plurality of loads from a compact location without the need for several electrical outlet boxes and without the need to reduce the rated load of each controlling device.

Where large number of devices are required to be controlled in a room or an area, larger faceplates, of similar design to faceplate 28 and faceplate 30 can be used for compact grouping of control elements.

Figure 2:
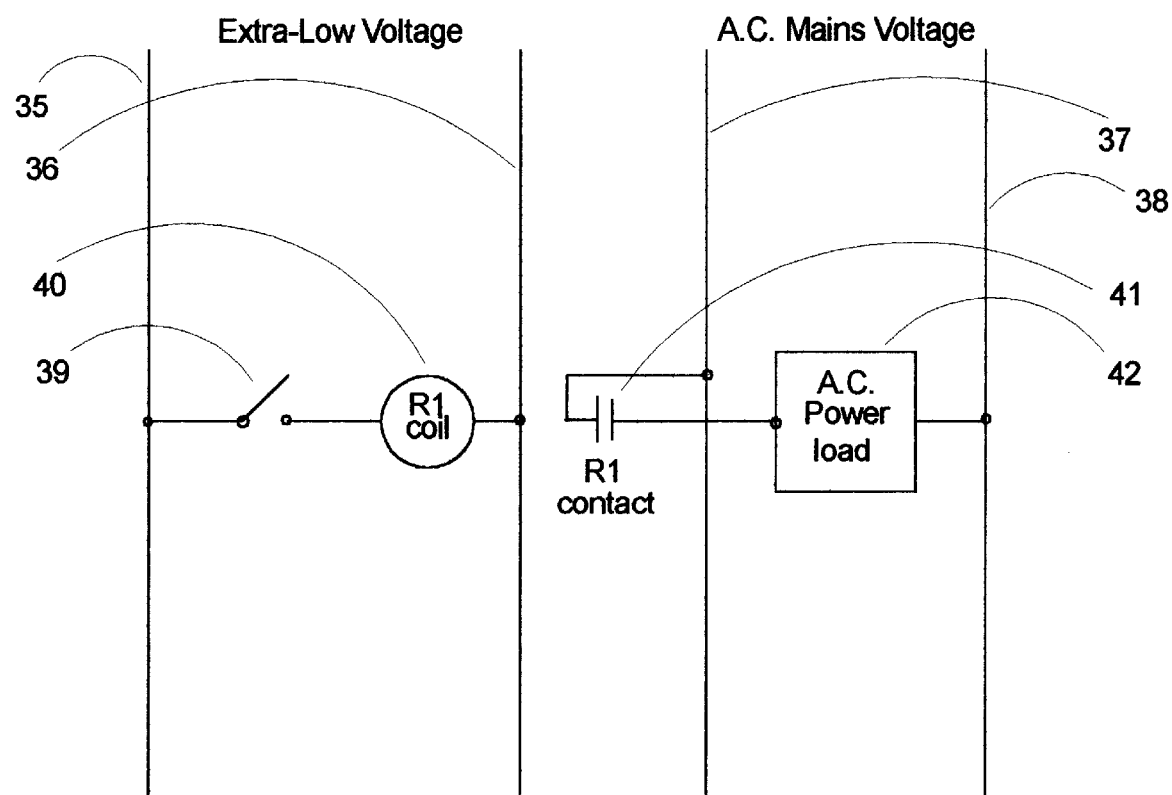
FIG. 2 is a schematic diagram of an electrical circuit in accordance with the present invention, showing a first method of providing ON/OFF control of a mains voltage power load from a remotely located extra low voltage control element.

Referring to FIG. 2, two separate wiring systems are shown. An extra low voltage wiring system has a first extra low voltage (normally less than 30 volts) wire 35 and a second extra low voltage wire 36 and receives a source of electrical power from an approved extra low voltage power supply. An AC mains wiring system (normally between 115 volts and 600 volts) has a first mains wiring conductor 37 and a second mains wiring conductor 38. A switch 39 is wired in series with an extra low voltage relay coil 40. The switch 39 controls the flow of current from the first extra low voltage wire 35 so that when the switch 39 is closed, current passes through the coil 40 to complete an electrical circuit through the second extra low voltage wire 36.

A set of mains voltage relay contacts 41, suitably rated for the controlled AC load, control an AC power load 42. The switch 39 is located on a faceplate at a position within a room, such as adjacent to a doorway, where a human being would expect to find a means of controlling a light within the room. The relay coil 40 and relay contacts 41 are located within the interior 10 of a controlling device 4 which is attached to a special electrical device enclosure (not shown). The controlling device 4 is located out of sight, behind wallboard on a wall or ceiling, immediately adjacent to the special electrical device enclosure from which the controlled AC power load receives a connection to the AC mains voltage wiring system. There is no physical contact between the mains voltage wiring system and the extra low voltage wiring system and the controlling switch is remote from the controlled device.

Figure 3:
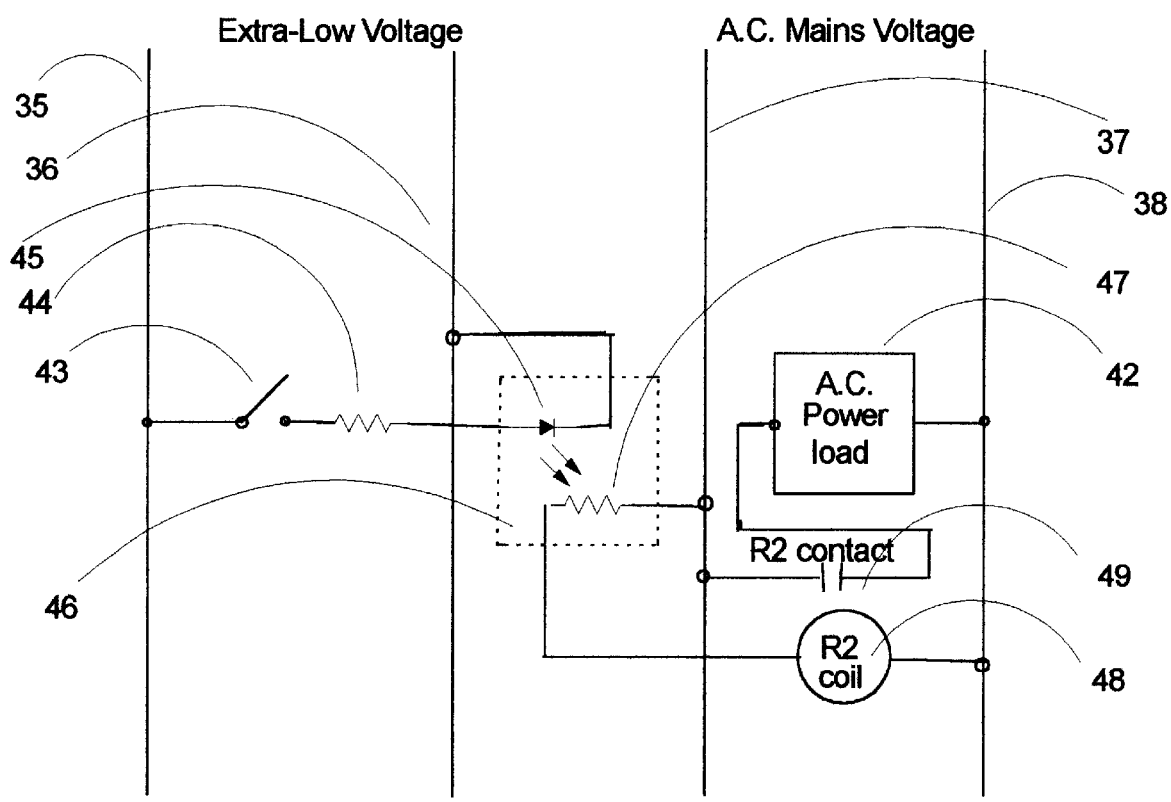
FIG. 3 is a schematic diagram of an electrical circuit in accordance with the present invention, showing a second method of providing ON/OFF control of a mains voltage power load from a remotely extra low voltage control element.

Referring to FIG. 3, two separate wiring systems are shown. An extra low voltage wiring system has a first extra low voltage (normally less than 30 volts) wire 35 and a second extra low voltage wire 36 and receives a source of electrical power from an approved extra low voltage power supply. An AC mains wiring system (normally between 115 volts and 600 volts) has a first mains voltage wiring conductor 37 and a second mains voltage wiring conductor 38. A switch 43 controls the current flow through a current limiting resistor 44 and the light emitting diode section 45 of an optical coupling device 46, such as the type MOC 3032. A light sensing section 47 of optical coupling device 46 is connected in series with a mains voltage relay coil. When the switch 43 is closed, current passes through the light emitting diode section 45 of optical coupling device 46 and this current is limited by the resistor 44. The light emitted by the light emitting diode section 45 of optical coupling device 46 is sensed by the light sensing section 47 of the optical coupling device 46. A current is then allowed to flow from the first mains voltage conductor 37, through the light sensing section 47 of the optical coupling device 46 and through the AC relay coil 48 to the second mains voltage conductor 38.

A set of mains voltage relay contacts 49, suitably rated for the controlled AC load, control an AC power load 42. The switch 43 is located on a faceplate at a position within a room, such as adjacent to a doorway, where a human being would expect to find a means of controlling a light within the room. The relay coil 48 and relay contacts 49 are located within the interior 10 of a controlling device 4 which is attached to a special electrical device enclosure (not shown). The controlling device 4 is located out of sight, behind wallboard on a wall or ceiling, immediately adjacent to the special electrical device enclosure from which the controlled AC power load receives a connection to the AC mains voltage wiring system. There is no physical contact between the mains voltage wiring system and the extra low voltage wiring system and the controlling switch is remote from the controlled device.

Figure 4:
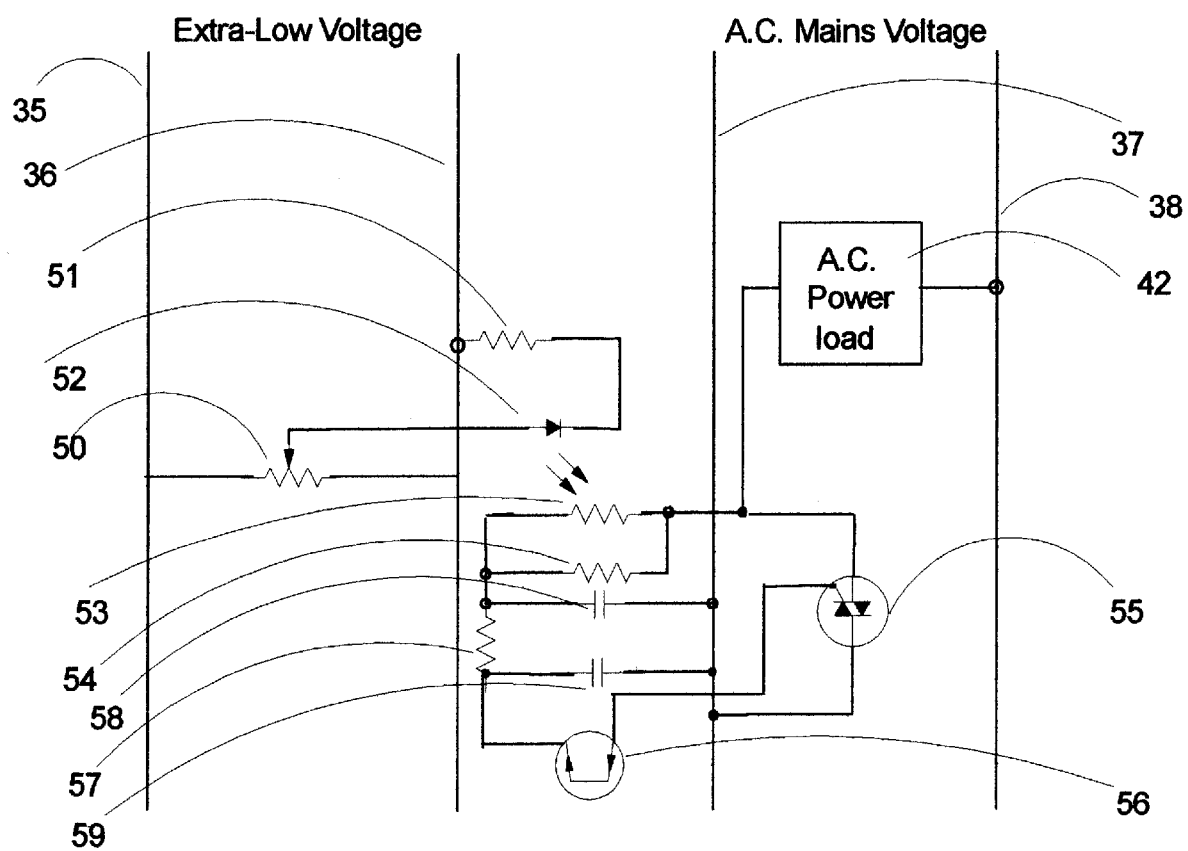
FIG. 4 is a schematic diagram of an electrical circuit in accordance with the present invention, showing a first method of providing variable control of a mains voltage power load from a remotely located extra low voltage control element.

Referring to FIG. 4, two separate wiring systems are shown. An extra low voltage wiring system has a first extra low voltage (normally less than 30 volts) wire 35 and a second extra low voltage wire 36 and receives a source of electrical power from an approved extra low voltage power supply. An AC mains wiring system (normally between 115 volts and 600 volts) has a first mains voltage wiring conductor 37 and a second mains voltage wiring conductor 38. A variable resistor 50 and a current limiting resistor 51 control the amount of current passing through the light emitting diode 52. The value of current limiting resistor 51 determines the maximum current flow in the circuit. Varying the variable resistor 50 will cause the current to vary between a maximum and a minimum value. The amount of light emitted by the light emitting diode 52 will vary in proportion to the current. The light emitting diode is preferably of the green ultra bright type.

A photo-resistor 53 is of a type that will have a low resistance of about 3000 ohms when the light emitting diode 52 is carrying the maximum current and a high resistance of about 3000000 ohms when the light emitting diode 52 is carrying the minimum current. The light emitting diode 52 and the photo-resistor 53 are located close together so that varying light from the light emitting diode 52 is sensed by the photo-resistor 53 and so that there is a gap between the light emitting diode 52 and the photo-resistor 53. The light emitting diode 52 and the photo-resistor 53 are sealed in a suitable insulating material so that light cannot enter or leave. A suitable plastic compound or bitumen type material or the like may be used to seal the components. A fixed resistor 54 having a value approximately equal to the value used for a typical variable resistance in a typical dimming switch is connected in parallel with photo-resistor 53. This value is about 200000 ohms. When the photo-resistor 53 senses maximum light, the equivalent resistance is 3000 ohms in parallel with 200000 ohms, or about 2955 ohms. When the photo-resistor senses minimum light, the equivalent resistance is 3000000 ohms in parallel with 200000 ohms, or about 187500 ohms. This range of resistance is suitable for the purpose of dimming lights.

Referring still in FIG. 4, a traic 55, a diac 56, a resistor 57, a first capacitor 58 and a second capacitor 59 co-operate with a variable resistance to provide variable power to an AC power load 42. The arrangement of the triac 55, the diac 56, the resistor 57, the first capacitor 58 and the second capacitor 59 is similar to a known method of providing light dimming control in which a variable resistor (not shown) connected mechanically to a knob, is adjusted by a human being in order to vary the brightness of lights. However, in the known method the variable resistance, adjustable by a human being, is part of the mains voltage circuit. In the present invention the variable resistance, adjustable by a human being, is part of an extra low voltage circuit which varies the current to a light emitting diode and is located remote from the triac 55, the diac 56, the resistor 57, the first capacitor 58 and the second capacitor 59 in an entirely different enclosure.

In the present invention the parallel connected resistor 56 and the photo-resistor 53 are part of the mains voltage circuit and control the triac power output in response to varying sensed light intensity. There is no physical contact between the mains voltage wiring system and the extra low voltage wiring system.

Figure 5:
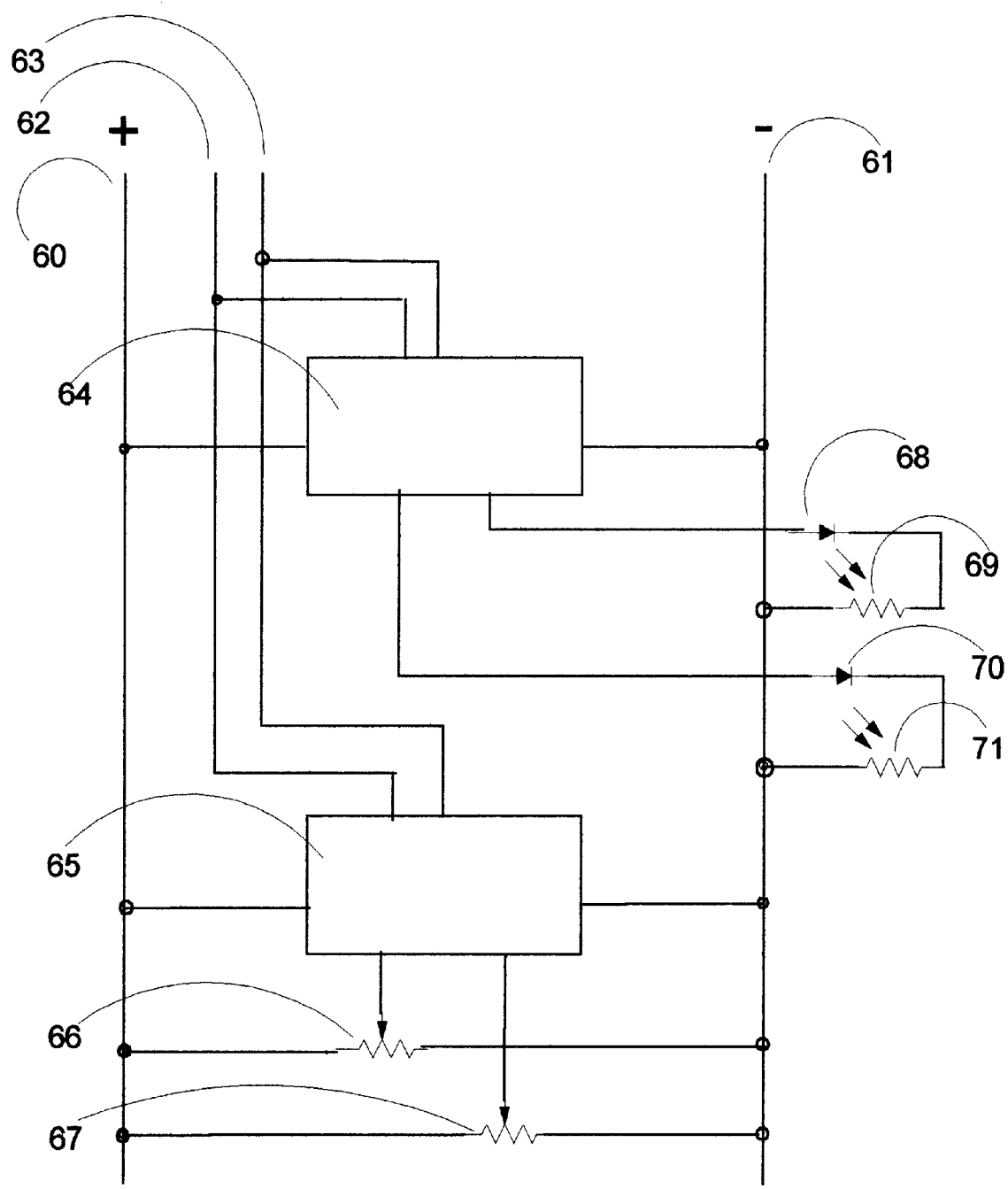
FIG. 5 is a schematic diagram of an electrical circuit in accordance with the present invention, showing a second method of providing variable control of a mains voltage power load from a remotely located low voltage control element.

Referring to FIG. 5, in this variant embodiment only an extra low voltage wiring system is shown. It will be understood from previous examples that by controlling the current flow through a relay coil or through a light emitting diode, control of a physically separate mains voltage power load can be achieved. A first extra low voltage wire 60 and a second extra low voltage wire 61 provide power for the system. A first data wire 62 and a second data wire 63 provide a data network such a Universal Serial Bus type of network.

A first microcontroller 64 is capable of accepting a serial connection to a network and is capable of controlling current through a light emitting diode. Said first microcontroller 64 is capable of storing a program in memory and may be of the Universal Serial Bus type of microcontroller. Said first microcontroller is located in the interior 10 of the controlling device 4, together with other components such as a triac, a relay, a photo-resistor and other components necessary to control a mains voltage power load.

A second micrcontroller 65 is capable of accepting a serial connection to a network and is capable of accepting inputs from devices such as switches and variable resistors. Said second microcontroller 65 is capable of storing a program in memory and may be of the Universal Serial Bus type of microcontroller. Said second microcontroller is located at grouped control elements enclosure 6, together with control elements such as switches and variable resistances.

Each microcontroller on the network is passed a token in turn by a controlling program which may reside in a master controller or may reside in the Universal Serial Bus host. Said second microcontroller 65 for example, uses an onboard program to monitor the state of inputs. Values from variable resistor 66 and variable resistor 67 are stored in memory. When said second micrcontroller 65 is passed a token by the controlling program, the variable values are passed back to the controlling program. The controlling program may then pass a token to said first microcontroller 64 with an instruction to turn on a light emitting diode. The onboard program in said first microcontroller 64 is used to interpret instructions and drive the output to light emitting diode 68 through current limiting resistor 69. Light emitting diode 70 may be controlled in a similar manner with current passing through current limiting resistor 71. Many variations for control are possible when microcontrollers are used. With the simple system shown in FIG. 5, which uses two output bits, it is possible to have an OFF, a LOW, a MEDIUM and a HIGH set of controls for a mains voltage power load using photo-resistors. A program can be used to send pulses to a light emitting diode in which the ON state and the OFF state are both individually timed. By controlling the duration and frequency of ON pulses, the average light sensed by a photo-resistor can be varied, thus allowing for several control settings.

As in previous methods described there is no physical contact between the mains voltage wiring system and the microcontroller power system. This variant of the present invention therefore provides a means for controlling a mains voltage power device from a system such as the Universal Serial Bus.

Other modifications will be apparent to those skilled in the art and, therefore, the invention is defined in the claims.

What is claimed is:

1. An electrical wiring system, in which wires from a mains voltage (normally 115 volts to 600 volts) source of supply, and wires from an extra-low voltage (normally 30 volts or less) source of supply, are routed within walls, and in particular within walls of stud and wallboard construction, within ceiling spaces or through joist spaces of a building, such as a home or an office, for the purpose of controlling the electrical current supplied to electrical devices such as receptacles, lights and heaters, so that said mains voltage wires enter an electrical device enclosure, said electrical device enclosure being of a type to which a device such as a receptacle or a light fixture may be attached, said electrical device enclosure also having a plate which covers a large opening in one wall of said electrical device enclosure, said plate being removable from within said electrical device enclosure, and so that said extra-low voltage wires are available for connection to a controlling device, said controlling device having controlling connections, controlled connections and said controlling device being installable through the open front of said electrical device enclosure, then through said large opening in one wall of said electrical device enclosure so that with said controlling device attached to said electrical device enclosure a physical barrier is present between said mains voltage wires and said extra-low voltage wires, said extra-low voltage wires being accessible when said removable plate is removed or when said controlling device is removed from within said electrical device enclosure.

2. A control system in which individual or grouped extra low voltage (normally 30 volts or less) control elements, such as switches and variable resistances, control one or more mains voltage (normally 115 volts to 600 volts) electrical devices, such as receptacles, lights or heaters, by means of wires, operating at extra-low voltage levels, connected to controlling devices, said controlling devices having controlled connections and controlling connections, said controlling devices comprising a means of providing electrical separation of said controlling connections from said controlled connections, such as a relay or an optical-coupling means, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

3. A control system in which individual or grouped extra low voltage (normally 30 volts or less) control elements, such as switches and variable resistances, control one or more mains voltage (normally 115 volts to 600 volts) electrical devices, such as receptacles, lights or heaters, by means of wires, operating at extra-low voltage levels, connected to controlling devices for the purpose of supplying power and for transferring digital data, said controlling devices having controlled connections and controlling connections, said controlling devices comprising a means of providing electrical separation of said controlling connections from said controlled connections, such as a relay or an optical-coupling means, said controlling devices further comprising a memory device for storing digital data, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical enclosure, said extra-low voltage wires being accessible by removal of said controlling device or by removal of said plate.

4. A control system in which individual or grouped extra low voltage (normally 30 volts or less) control elements, such as switches and variable resistances, control one or more mains voltage (normally 115 volts to 600 volts) electrical devices, such as receptacles, lights or heaters, by means of wires, operating at extra-low voltage levels, connected to controlling devices for the purpose of supplying power and for transferring digital data, said controlling devices having controlled connections and controlling connections, said controlling devices comprising a means of providing electrical separation of said controlling connections from said controlled connections, such as a relay or an optical-coupling means, said controlling devices further comprising a microcontroller for storing and manipulating digital data, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, sand plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

5. A control system in which individual or grouped extra low voltage (normally 30 volts or less) control elements, such as switches and variable resistances, are used as inputs to a microcontroller, said microcontroller containing a program to interpret said inputs and provide outputs for control of one or more mains voltage (normally 115 volts to 600 volts) electrical devices, such as receptacles, lights or heaters, by means of wires, operating at extra-low voltage levels, connected to controlling devices for the purpose of supplying power and for transferring digital data, said controlling devices having controlled connections and controlling connections, said controlling devices comprising a means of providing electrical separation of said controlling connections from said controlled connections, such as a relay or an optical-coupling means, said controlling devices further comprising a memory device for storing digital data, said controlling devices being of a physical size and shape that permits said controlling devices to be installed through the open front of an electrical device enclosure, said electrical device enclosure being of the type that is installed in a wall or ceiling so that he front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

6. A control system in which individual or grouped extra low voltage (normally 30 volts or less) control elements, such as switches and variable, are used as inputs to a first microcontroller, said first microcontroller containing a program to interpret said inputs and transfer data to one or more additional microcontrollers so that said additional microcontrollers, through a program stored therein, can control one or more mains voltage (normally 115 volts to 600 volts) electrical devices, such as receptacles, lights or heaters, by means of wires, operating at extra-low voltage levels, connected to controlling devices for the purpose of supplying power and for transferring digital data, said controlling devices having controlled connections and controlling connections, said controlling devices comprising a means of providing electrical separation of said controlling connections from said controlled connections, such as a relay or an optical-coupling means, said controlling devices further comprising a microcontroller for storing and manipulating digital data, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, whie said controlling connections of said controlling device are available for connection to said extra-low voltage wires outside of said electrical device enclosure, said extra-low voltage wires being accessible by removal of said controlling device or by removal of said plate.

7. A control system in which individual or grouped extra low voltage (normally 30 volts or less) control elements, such as switches and variable resistances, are used as inputs to a first microcontroller, said first microcontroller being of a type suitable for use with the Universal Serial Bus, said first microcontroller manipulating said input data and transferring an interpretation of said input data to a program located within the Universal Serial Bus host computer, said host computer program also producing output data which is transferred to one or more additional microcontrollers, said additional microcontrollers being of a type suitable for use with the Universal Serial Bus, so that said additional microcontrollers, through a program stored therein, can control one or more mains voltage (normally 115 volts to 600 volts) electrical devices, such as receptacles, lights or heaters, by means of wires, operating at extra-low voltage levels and of a type suitable for use in the transfer of data at speeds required by the Universal Serial Bus, connected to controlling devices for the purpose of supplying power and for transferring digital data, said controlling devices having controlled connections and controlling connections, said controlling devices comprising a means of providing electrical separation of said controlling connections from said controlled connections, such as a relay or an optical-coupling means, said controlling devices further comprising a microcontroller of a type suitable for use with the Universal Serial Bus, said controlling devices being of a physical size and shape that permits said controlling devices to be installed through the open front of an electrical device enclosure, said electrical device enclosure being of the type that is installed in a wall or ceiling so that the front edges appear flush with the finished wall or ceiling, said electrical device enclosure also being of a type to which a device such as a receptacle or a light fixture may be attached, said electrical device enclosure also having a plate which covers a large opening in one wall of said electrical device enclosure, said plate being removable from within said electrical device enclosure to expose a large opening through which said controlling device may pass, so that one wall of said controlling device completes one wall of said electrical device enclosure and so that said controlled connections of said controlling device are available for connection to said mains voltage wires within said electrical device enclosure, while said controlling connections of said controlling device are available for connection to said extra-low voltage wires outside of said electrical device enclosure, said extra-low voltage wires being accessible by removal of said controlling device or by removal of said plate.

* * * * *